US006841034B2

(12) United States Patent
Zuehlke et al.

(10) Patent No.: US 6,841,034 B2
(45) Date of Patent: Jan. 11, 2005

(54) DEVICE FOR WELDING THERMOPLASTIC PLASTIC PARTS FORMING A HOLLOW BODY BY MEANS OF LASER RADIATION

(75) Inventors: Hans-Ulrich Zuehlke, Jena (DE); Gabriele Eberhardt, Jena (DE); Norbert Preuss, Jena (DE); Martin Griebel, Jena (DE); Juergen Weisser, Jena (DE)

(73) Assignee: JENOPTIK Automatisierungstechnik GmbH, Jena (DE)

( * ) Notice: Subject to any disclaimer, the term of this patent is extended or adjusted under 35 U.S.C. 154(b) by 247 days.

(21) Appl. No.: 10/125,206

(22) Filed: Apr. 17, 2002

(65) Prior Publication Data

US 2002/0179252 A1 Dec. 5, 2002

(30) Foreign Application Priority Data

Apr. 23, 2001 (DE) ........................................ 101 20 351

(51) Int. Cl.$^7$ ............................................. B32B 31/28
(52) U.S. Cl. ................ 156/379.8; 156/380.9; 156/499; 156/272.8; 156/273.7; 156/304.2; 156/304.6; 269/21; 219/121.63; 29/743
(58) Field of Search ................ 156/272.2, 272.8, 156/273.7, 304.1–304.2, 304.6, 380.9, 378, 379.8, 499, 285–287; 65/36; 228/212, 44.3, 49.1, 221, 218; 269/21; 219/121.6–121.66; 29/559, 743, 760

(56) References Cited

U.S. PATENT DOCUMENTS

| 3,876,409 A | 4/1975 | Sangermano et al. |
| 4,414,460 A | * 11/1983 | Sudo et al. ............ 219/121.64 |
| 4,857,811 A | * 8/1989 | Barrett et al. .................. 318/3 |
| 4,982,555 A | 1/1991 | Ingemann |
| 6,000,600 A | * 12/1999 | Erikson et al. ............. 228/212 |

FOREIGN PATENT DOCUMENTS

| DE | 3704792 | * 9/1988 | ........... B23K/15/00 |
| JP | 54 080338 | 6/1979 | |
| JP | 59 184 750 | 10/1984 | |
| JP | 11 348132 | 12/1999 | |

OTHER PUBLICATIONS

English Abstract of JP 54 080338.
English Abstract of JP 11 348132.
English Abstract of JP 59 184 750.

* cited by examiner

*Primary Examiner*—Blaine Copenheaver
*Assistant Examiner*—Jessica Rossi
(74) *Attorney, Agent, or Firm*—Reed Smith LLP

(57) ABSTRACT

A device for welding a plurality of thermoplastic plastic parts (parts to be joined) forming a hollow body with an opening by a laser, comprising a vacuum holder having a vacuum chamber which communicates with a vacuum pump, is open on one side and, together with the hollow body, forms a closed chamber that can be evacuated. When a vacuum is applied, the vacuum holder holds the hollow body stationary, holds the joined parts together and enables testing of the tightness of the weld.

1 Claim, 1 Drawing Sheet

DEVICE FOR WELDING THERMOPLASTIC PLASTIC PARTS FORMING A HOLLOW BODY BY MEANS OF LASER RADIATION

CROSS-REFERENCE TO RELATED APPLICATIONS

This application claims priority of German Application Serial No. 101 20 351.9, filed Apr. 23, 2001, the complete disclosure of which is hereby incorporated by reference.

BACKGROUND OF THE INVENTION a) Field of the Invention

The invention is directed to a device for welding thermoplastic plastic parts forming a hollow body by means of laser radiation as is known generically from JP 11348132.

b) Description of the Related Art

Thermoplastic plastic parts (parts to be joined) can be connected to one another by different welding methods in which different kinds of energy, such as laser radiation, are used to fuse the parts to be joined.

DE 19510493 describes a thermoplastic housing and a method for welding thermoplastic housing parts by means of a laser. The basic idea consists in that the two housing parts to be welded, at least in the region of the joint zone (entire area in which a melt is formed), are made on the one hand from a material which is extensively transparent to the laser radiation and, on the other hand, from a material which extensively absorbs the laser radiation, and the laser radiation is directed to the housing in such a way that it initially penetrates the material that is transparent to the laser radiation and subsequently impinges on the material which absorbs the laser radiation.

The fact that the energy needed for producing the weld connection can reach the joint zone via one of the parts to be joined allows the possibility of a free arrangement of the weld seam in the housing, i.e., the weld seam need not extend in a plane, but may also extend three-dimensionally or in the interior of the housing. In principle, this allows a much more flexible possibility for shaping the housing parts and joint zone compared with other methods known from the prior art. Moreover, even housings with very thick walls can be welded. The parts to be joined can be butt-joined or lap-joined.

The quality of a weld formed in this way, which is intended in particular to ensure a tight connection between the joined parts, but also should be formed without melt flashing so as to avoiding finishing work, is influenced by various steps in the prior art. This may involve special arrangements of the housing parts in the area of the joint zone which influence the shape of the melt and/or producing an engagement (frictional or positive connection) between the housing parts to be joined during the welding process in order to achieve a defined joining gap.

It is stated in DE 195 10 493 that the quality of the weld can be enhanced by applying pressure to the joining zone until cooled. In so doing, the pressure should preferably be applied adjacent to the focus of the laser beam, so that the laser radiation can penetrate into the workpiece without hindrance. Also expressed is the idea of using transparent clamping means in the area of the laser beam in order to be able to carry out the application of pressure directly in the area in which the laser radiation acts. The pressure action should preferably follow the movement of the laser beam along the joint zone.

A disadvantage in generating applied force, as suggested herein, is that the parts to be joined must be shaped in such a way that clamping means can make contact in the area of the joint zone. Readjustment of the clamping means requires constant tightening and loosening which, in particular, requires additional expenditure on apparatus. Moreover, the time in which force is applied in each instance is very limited when readjusting the clamping means unless the duration over which the process is carried out is increased.

In DE 4432081, devices for fixing the parts to be joined for welding by radiation energy are criticized as disadvantageous because of their wastefulness. The stated object is to find a solution in which plastic parts can be welded together by means of radiation energy without devices for fixing the parts to be connected. The solution consists in that the parts to be joined are fixed with respect to one another by a positive engagement, particularly in the effective direction of force, starting with the formation of the melt (melt pressure), e.g., by means of a snap-in connection or a thread. It is also suggested that the parts to be joined be fixed relative to one another by an "inner frictional engagement such as screws or magnets". Fixing must then be dimensioned only in such a way that the local welding pressure moving along the contour of the seam as the beam is guided is absorbed.

However, this means that special steps must be taken in every case with respect to the construction of the two parts to be joined. Even if this did not contradict the function and desired arrangement, it necessarily means increased preliminary fabrication costs and additional material costs, e.g., for the above-mentioned magnets or screw connections. In the case of large-series manufacture and mass production, the increased expenditure may far exceed the expenditure on apparatus for fixing, which can be reused over and over.

DE 4225679 is directed to a method and a device for welding the upper part and lower part of a housing, wherein a filter disk is introduced between the housing parts to be welded. In this case, particularly strict requirements are imposed on the dimensional tolerance of the joint gap and on the strength of the joint seam. Continuous quality control must be carried out. In the described device, the individual parts to be welded must be arranged one on top of the other and pressed together by a pressing device, while a laser beam is guided along the joint seam to be welded. No mention is made in the description regarding the pressing device or the contact pressing force generated by it.

JP 11348132 also discloses a method and a device for laser welding. In this case, also, two housing parts forming a hollow body are to be welded together by means of a laser. Specifically, the hollow body mentioned herein is a lamp with a reflector as lower part of the housing and a light disk as upper part of the housing. The reflector is arranged horizontally in a stationary manner so as to be supported by its edge on the cylinder wall of a holding device. A pressing device supported on the light disk presses the light disk firmly on the edge of the reflector. On the one hand, the holding device and the pressing device in cooperation perform the function of the pressing or clamping devices known in the art in that they press together the two parts to be joined at their joining surfaces forming the joint zone; on the other hand, it serves to hold and accordingly position the housing relative to the laser which is guided along the joint zone for carrying out the welding process. Compared with the solutions known in the art for pressing together the joint surfaces, this solution is characterized in that the housing is held and positioned by it in addition.

However, the disclosed device is narrowly limited in its application with respect to the shape of the housing and the position of the joint zone in the housing. Further, the shape of the pressing device must be adapted to the surface shape of the light disk.

It is not known from the prior art whether a device of this kind performs additional functions beyond those of pressing together the joint surfaces and holding the housing.

OBJECT AND SUMMARY OF THE INVENTION

It is the primary object of the invention to provide a device by which a hollow body which comprises a plurality of parts to be joined and which is provided with an opening can be held stationary for purposes of welding by laser radiation, held together and tested for tightness of the weld. The device must generate a uniform joining pressure in the joint zone and be usable for a variety of differently shaped hollow bodies.

The object of the invention is met for a device for welding a plurality of thermoplastic plastic parts forming a hollow body with an opening in that the device for holding and the device for generating a force are comprised in an individual vacuum holder (1) which has a vacuum chamber (2) that communicates with a vacuum pump (4), is open on one side and, together with the hollow body, forms a closed chamber which can be evacuated.

An idea essential to the invention consists in that, due to the fact that a vacuum chamber which is open on one side is closed by the part of the hollow body having the opening, all joint zones between the parts to be joined which form the hollow body are acted upon, regardless of their position and geometric shape, by a joining pressure when the vacuum chamber is evacuated.

The invention will be described more fully in the following with reference to embodiment examples and drawings.

DESCRIPTION OF THE PREFERRED EMBODIMENTS

Figure 1:
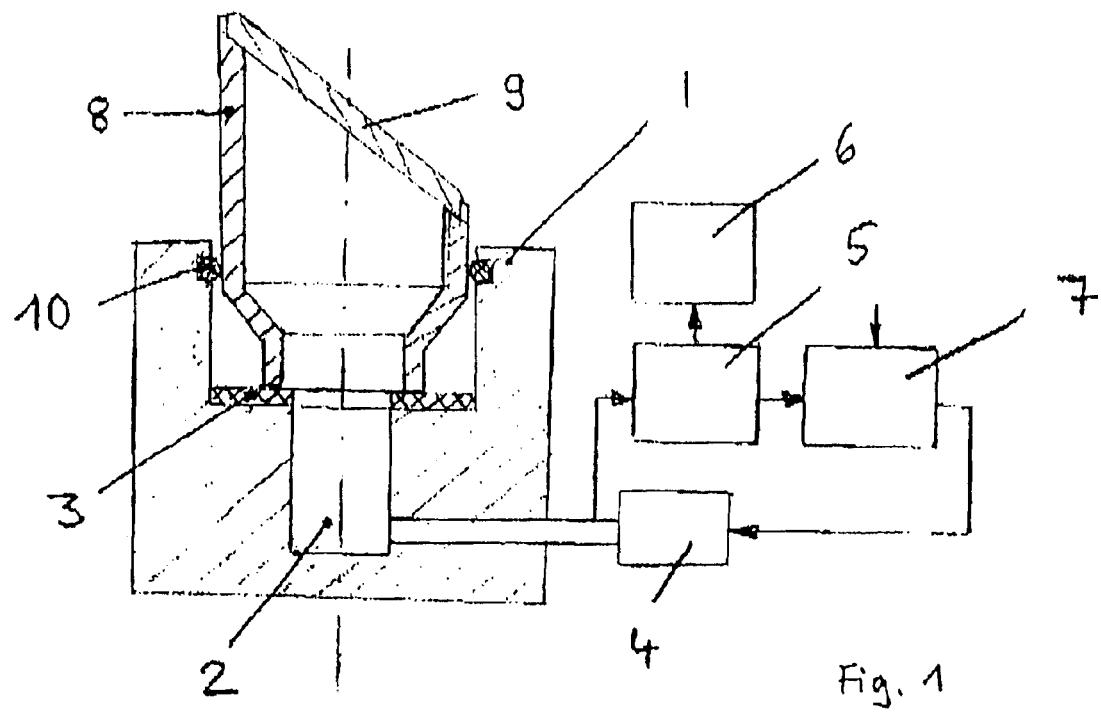
FIG. 1 shows a schematic view of a device according to the invention with a first construction of the vacuum holder with a first housing.

The device shown in FIG. 1 essentially comprises a vacuum holder 1 with a vacuum chamber 2 and a sealing disk 3 and a vacuum pump 4 connected to the vacuum chamber 2, a pressure sensor 5, a signal-transmitting unit 6 and a control unit 7. The device serves to hold a hollow body comprising a plurality of parts to be joined, to press together the parts to be joined and to test the tightness of the weld produced between the joint surfaces.

The specific construction of the vacuum holder 1 may vary depending on the shape of the hollow body to be held. In the construction shown in FIG. 1, a lamp housing is to be held, this lamp housing comprising a reflector 8 constituting the lower part to be joined and a light disk 9 constituting the upper part to be joined. The reflector 8 is constructed so as to be rotationally symmetric at the end remote of the light disk 9 with an opening about its axis of symmetry. The terminating surface surrounding the opening is a radial plane surface. The reflector 8 is placed by this plane surface on the sealing disk 3 resting on the vacuum chamber 2. In every case, the vacuum chamber 2 is a chamber which is open on one side and which, only after insertion of the entire hollow body into the vacuum holder 1, forms together with the latter a closed chamber which can be evacuated. When the reflector 8 is placed on the sealing disk 3, it is guided along its circumferential surface into an O-ring 10 in such a way that the opening of the reflector completely encloses the open side of the vacuum chamber. In the lamp housing shown in FIG. 1, the two parts to be joined are connected with one another in a positive engagement to the extent that there is still a free translatory movement direction. The positive engagement serves merely as an aid for assembly in this case and conceals the joint zone from the outside. This positive engagement no longer has a holding function after the vacuum is applied in the vacuum chamber 2. When a vacuum is generated, the light disk 9 is pressed by its joint surface against the joint surface of the reflector 8 with a force proportional to the vacuum and accordingly also presses the reflector 8 itself around the opening on the sealing disk 3 by its plane surface. It is not possible with any of the clamping means known from the description of the prior art to generate such a uniform and easily controllable joining force without obstructing free access to the joint zone for the welding tool. A tool head (not shown) for directing the laser beam to the joint zone can be directed axially to radially on the joint zone from many different directions. The joint zone can accordingly occupy virtually any position on the hollow body. Hollow bodies comprising more than two parts to be joined can also be held for laser welding with this vacuum holder 1. With respect to the chosen example of a lamp housing, it may be useful, e.g., to form the light disk from a plurality of segments and connect it to the reflector. In principle, the shape of the individual parts to be joined is unimportant; it is only necessary that, together, they form a hollow body with an opening.

The manner of operation of the device shown in FIG. 1 will now be described.

Figure 2:
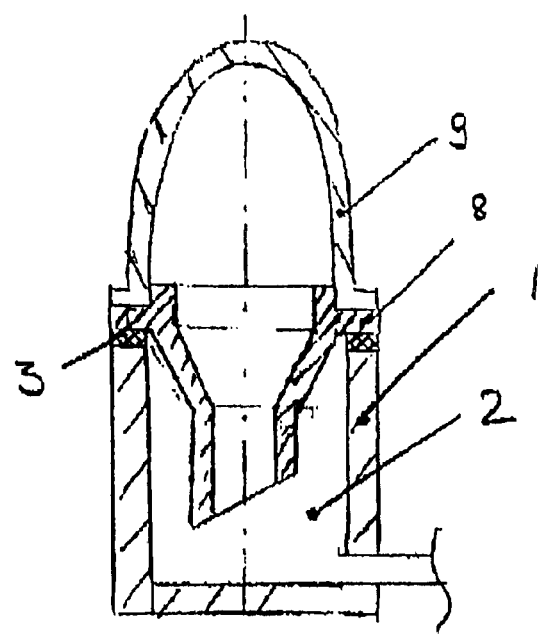
FIG. 2 shows a schematic view of a second construction of the vacuum holder with a second housing.

After the reflector 8 is placed on the vacuum chamber 2 and the light disk 9 has been joined to the reflector (naturally, the parts can also be assembled beforehand) and a vacuum of suitable intensity has been produced, the laser welding process begins. As in conventional methods and devices, the laser beam is guided along the joint zone. After the welding process has been concluded, the vacuum is still maintained for a while in order to test the tightness of the weld. In so doing, the device according to the invention fulfills its third function. The vacuum is monitored via a pressure sensor 5. In the embodiment example described with reference to FIG. 1, the pressure sensor 5 is connected with a signal-transmitting unit 6 and a control unit 7. The signal-transmitting unit 6 can be, for example, a unit transmitting a video signal, namely, a monitor, on which the pressure increase and pressure drop are illustrated graphically. It can also deliver an acoustic signal, e.g., in case of a too rapid increase in pressure resulting from a leaky weld. However, it can also be a printer which documents the test results as proof of 100% quality control. By forwarding the measurement results of the pressure sensor 5 to the control unit 7 connected with the vacuum pump 4, it is possible to regulate the vacuum generation as a function of the pressure increase, particularly during the welding process, in order to ensure a constant joining pressure. Of course, a determined pressure curve can also be realized by means of the control unit instead of a constant joining pressure during the welding process. FIG. 2 shows a second construction of a vacuum holder. It likewise serves to receive a lamp housing comprising a reflector 8 and a light disk 9. The reflector 8 is also substantially a rotationally symmetric part with an opening around the axis of symmetry in this case. However, the surface bordering the opening is not located in a radial plane in this case, but rather in a plane which is inclined relative to the axis of symmetry. This surface is therefore not particularly well suited to act as a sealing surface directly or indirectly via a sealing disk 3. Therefore, another circumferential surface of the hollow body must be found for sealing. A collar on the reflector 8 placed on the sealing disk 3 is available for this purpose. At the same time, the collar also offers the joint surface necessary for producing the weld connection with the light disk 9.

The signal-transmitting unit 6 mentioned in the first embodiment example is not necessary when there is no testing of tightness carried out with the device. In principle, the use of the device is not limited to application in laser welding. However, it can be used in a particularly advantageous manner for this purpose, since the possibilities of guiding the tool head relative to the housing remain entirely unaffected and the advantages of laser welding can accordingly be exploited to the fullest.

While the foregoing description and drawings represent the present invention, it will be obvious to those skilled in the art that various changes may be made therein without departing from the true spirit and scope of the present invention.

List of Reference Numbers

| | |
|---|---|
| 1 | vacuum holder |
| 2 | vacuum chamber |
| 3 | sealing disk |
| 4 | vacuum pump |
| 5 | pressure sensor |
| 6 | signal-transmitting unit |
| 7 | control unit |

| -continued | |
|---|---|
| 8 | reflector |
| 9 | light disk |
| 10 | O-ring |

What is claimed is:

1. A device for welding a plurality of thermoplastic plastic parts forming a hollow body with an opening, comprising:

a device for holding stationary the hollow body composed of the thermoplastic plastic parts;

a device for generating a force which presses together surfaces of the thermoplastic plastic parts forming a joint zone; and a tool head which is guided along the joint zone and which introduces laser radiation resulting in a weld into the joint zone;

said device for holding and said device for generating a force being comprised of an individual vacuum holder which has a vacuum chamber that communicate with a vacuum pump, is open on one side and, together with the hollow body, forms a closed chamber which can be evacuated, wherein the open side of the vacuum chamber is smaller in cross section than the opening of the hollow body, and the hollow body rests on a sealing disk surrounding the open side of the vacuum chamber by a terminating surface forming the opening.

* * * * *